Figure 1:
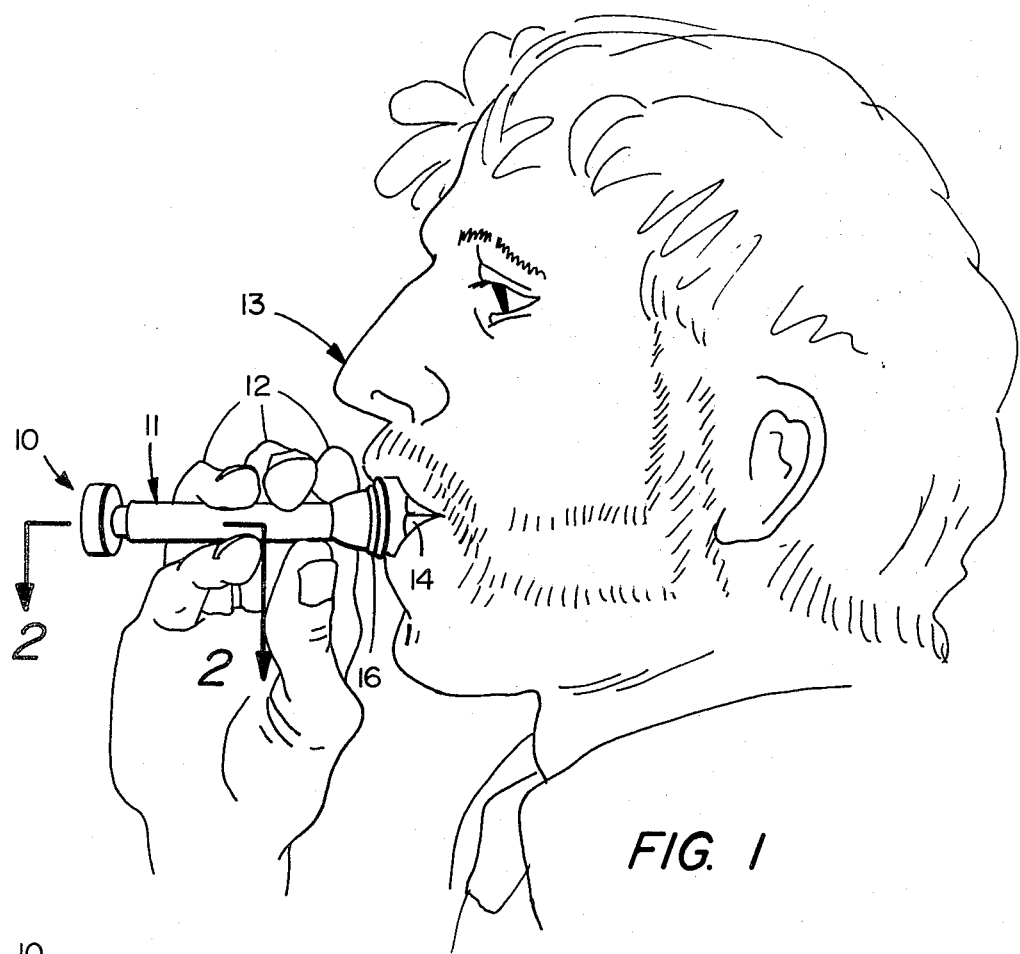

United States Patent [19]

Lamart

[11] 4,378,724
[45] Apr. 5, 1983

[54] WIND INSTRUMENT PRACTICE ACCESSORY

[76] Inventor: Rene Lamart, 7205 Fountain Ave., West Hollywood, Calif. 90046

[21] Appl. No.: 284,621

[22] Filed: Jul. 20, 1981

[51] Int. Cl.³ .................... G09B 15/06; G10D 9/02
[52] U.S. Cl. ........................... 84/465; 84/398; 84/453
[58] Field of Search ......... 84/383 R, 387 R, 398–399, 84/453, 465

[56] References Cited

U.S. PATENT DOCUMENTS

| | | | |
|---|---|---|---|
| 2,118,684 | 5/1938 | Prescott | 84/465 |
| 3,224,315 | 12/1965 | Guinness | 84/383 R |
| 3,569,489 | 5/1972 | Vale | 84/465 |
| 3,853,034 | 12/1974 | Vale | 84/465 |

OTHER PUBLICATIONS

L. A. Elkington, 1963 Musical Products Catalog, p. 36.

*Primary Examiner*—Lawrence R. Franklin
*Attorney, Agent, or Firm*—Flehr, Hohbach, Test, Albritton & Herbert

[57] ABSTRACT

A practice device for brass and woodwind musical instruments projects into one end of the instrument mouthpiece affording resistance like that of the instrument. Resilient gripping members hold the device at a position selected by the player so that a reaction surface on the device is spaced at a desired distance from the mouthpiece end.

3 Claims, 3 Drawing Figures

WIND INSTRUMENT PRACTICE ACCESSORY

This invention concerns musical wind instruments generally and particularly relates to a device co-operable with the mouthpiece of a wind instrument to assist in practicing with the mouthpiece per se.

Playing a musical instrument either as a vocation or avocation entails a substantial time commitment devoted to practicing. For example, a person studying the trumpet should be prepared to commit at least three hours a day every day for 4 to 6 years to practicing on the instrument. This follows from the recognition that performance on the high brass instruments, and indeed the other wind instruments as well, is similar to athletic training in which the performer must constantly maintain the condition of the embouchure tissue, supporting musculature as well as the breathing apparatus for supplying the necessary air and control to form musical tones with the instrument.

The value of playing upon the mouthpiece of the instrument alone is known as disclosed in my earlier U.S. Pat. No. 3,451,302. There I disclosed the sequence of forming sounds first in the mouthpiece and then to join the mouthpiece with the instrument to promote development of the control of the sound, attack of the tone and to develop a more resonant tone production over the full range of the instrument. In the procedure disclosed in that patent there was but a small hiatus between initiating the tone in the mouthpiece and joining the mouthpiece with the instrument and the player would not lose the kinesthetic sense of the "resistance" supplied by the instrument when producing the desired tone. It is understood that wind instruments, and especially brass instruments, may be viewed as acoustic impedance systems or wave guides and the player relies upon, either consciously or unconsciously, the impedance or resistance value of the instrument when generating a musical tone. In practicing with the mouthpiece alone the results are generally only approximate in the player's view because the player must compensate in playing on the mouthpiece alone for a lack of resistance furnished normally by the associated musical instrument. Thus, practicing on the mouthpiece alone, although having some value in stimulating blood circulation in the embouchure, would have substantially more benefit to players if the resistance could be supplied so that playing on the mouthpiece alone would more closely simulate playing on the mouthpiece and instrument together insofar as the blowing feel is concerned.

In summary, the invention resides in an accessory co-operable with the mouthpiece of a musical wind instrument for use to simulate the resistance supplied by the instrument, such mouthpiece having one end for co-operating with the player's embouchure with the other end having a cylindrical longitudinal bore therethrough. The accessory device comprises a base having a dimension larger than the diameter of the mouthpiece bore. A plug is mounted on the base and has a cross sectional area less than the area of the mouthpiece bore permitting the plug to project into the bore. Friction retainer means are arranged on the one end of the plug and extend outwardly therefrom to serve to engage the sidewalls of the mouthpiece bore for mounting the accessory in the mouthpiece in positions where the base is spaced from the mouthpiece end to supply the needed resistance.

An object of the invention is to provide a device co-operable with the mouthpiece of a musical wind instrument which when used will promote the sensation in the player of having a quick warm-up of the embouchure.

Another object of the invention is to provide a device co-operable with the mouthpiece of a musical wind instrument which will promote free lip vibration and serve to correct embouchure problems.

Another object of the invention is providing an accessory of the type described for a musical instrument which will assist the player in finding the correct position of the tongue in the oral cavity for each note of the musical scale.

Another object of the invention is to provide an accessory of the type described which will assist the player in finding the correct combination of embouchure, tongue and breath for producing notes which are usually difficult to play upon the instrument.

These and other objects of the invention will become apparent from the following description taken in connection with the drawings.

Figure 2:
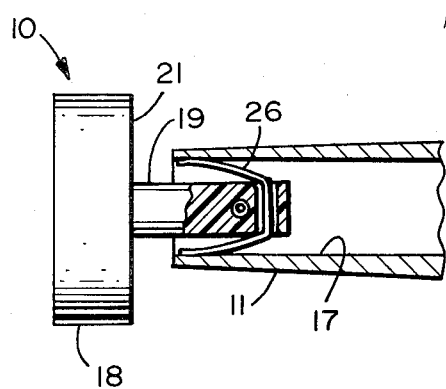
Figure 3:
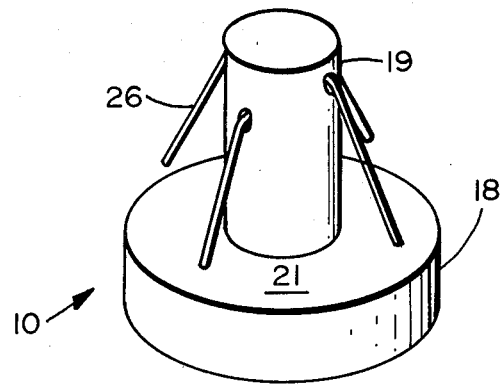

FIG. 1 of the drawings is a profile view of a player "buzzing" on a trumpet mouthpiece in which there is mounted the accessory device of the present invention;

FIG. 2 is an enlarged longitudinal sectional view in the direction of the arrows 2—2 of FIG. 1; and FIG. 3 is an enlarged perspective view of the accessory device of the present invention.

Referring to FIG. 1 in the drawings, a practicing device 10 is shown operatively mounted in a trumpet mouthpiece 11 held by the fingers 12 of the player 13 in the playing position upon the lips 14 which with the facial muscles define the embouchure of the player. In this instance the mouthpiece is that of a trumpet but it should be understood that the practice device 10 is useful with mouthpieces for use with cornets, trumpets, flugelhorns, French horns, trombones, euphoniums, tubas, as well as with clarinets, saxophones, oboes, bassoons and English horns. In other words, with most of the instruments of the wood-wind and brass-wind instrument families.

Considering now the mouthpiece 11 in more detail, it is understood that a mouthpiece includes a proximal end 16 which comprises portions which engage the player's mouth. In a brass wind mouthpiece these include the rim, cup and bore and function as a resonator such that when the tissue of the player's lips is set into motion by the airstream emanating from the player's body vibrations resonate within the mouthpiece as well as within the oral cavity of the player so that a wave of sound is sent down through the longitudinal bore 17 (FIG. 2) of the mouthpiece and thence into the instrument (not shown). The device 10 of the present invention operates on the principle that by simulating the resistance of the instrument, the resistance being selected by the player 13, many of the benefits of playing the instrument will be achieved by playing upon the mouthpiece 11 equipped with the device 10. This is especially valuable when it is not practical to play the instrument such as when driving an automobile, or out of deference to neighbors late at night, in hotel rooms, etc.

The device 10 includes a base 18 and a plug or post 19. The base 18 may be generally cylindrical in form but its main function is to afford a reaction surface to the sound wave emanating from the bore 17 of the mouthpiece. In this connection the essential factor of the base 18 is that it have a large dimension greater than the diameter of the bore 17 of the mouthpiece 11 so that the face 21 of the base may serve as a sound reaction surface.

The plug or post 19 projects outwardly from the surface 21 into the bore 17 of the mouthpiece to occupy a substantial area within the mouthpiece, thus contributing to the resistance factor desired. The post 19 may be cylindrical in cross section but other configurations such as hexagonal, square, octagonal, etc., can be useful in furnishing the necessary playing resistance.

A plurality of tines 26 are resiliently mounted at the end of the plug 19 and project outwardly for engagement with the sidewalls of the bore 17, as shown in FIG. 2. The tines 26 may be 2 or 4 in number, formed from wind spring stock, and extend outwardly and project towards the base 18 to facilitate insertion of the plug element into the longitudinal bore of the mouthpiece. The ends of the tines may be either straight or curled over but their purpose is to furnish a resilient frictional contact with the sidewalls of the bore to hold the unit 10 against the force of air and vibration passing down the bore during use of the device 10 in practicing by the player.

It will be seen from FIG. 2 that the surface 21 is spaced from the distal end of the mouthpiece. This spacing may be adjusted by the player to achieve a desired resistance otherwise experienced when playing his particular musical instrument. The player forms the sound in the mouthpiece and with the unit 10 operatively positioned obtains the desired "back pressure" providing stimulation to the overall physical playing apparatus, the embouchure, lungs, chest, diaphram, to a degree which approximates the experience of using the mouthpiece and instrument together.

The advantages of using the practice device 10 as described herein are that it permits the player to identify that he or she is producing the correct pitch in the mouthpiece without the assistance of the instrument. It is known that the pitches of the scale must be correct with the mouthpiece alone before they will sound properly with the instrument. In this mode of practice the player may quickly warm up as well as attune his ear and other kinesthetic feelings connecting the sensation of playing a sound with the sound itself all independent of playing upon the instrument. Then when the instrument is coupled to the mouthpiece 11 it has been observed that the player plays much more accurately with a fuller, more complete sound and that the notes fall properly in tune within the musical scale.

From the above it will be appreciated that there has been disclosed herein a unique practice device which fulfills all of the objectives and advantages of the invention mentioned above. The invention is defined by the claims which follow.

What is claimed is:

1. An accessory co-operable with the mouthpiece portion of a wind musical instrument for use in practicing without the complete instrument, said mouthpiece portion having one end co-operable with the player's embouchure and the other end adapted for connection to the instrument, said mouthpiece portion having a generally cylindrical longitudinal bore therethrough, said bore having its largest diameter adjacent said other end, said accessory comprising, a base having a dimension larger then said largest diameter of said bore, and a plug mounted on said base and having a cross sectional area less than the cross sectional area of said largest diameter permitting the plug to project into the bore for a distance greater than said largest diameter of the bore, friction retaining means arranged on said plug and extending outwardly therefrom serving to engage the sidewalls of said bore adjacent said other end for maintaining the device in connection with the mouthpiece at a selected position so that the base is spaced a selected distance from said mouthpiece other end.

2. The accessory for use with the mouthpiece of a wind musical instrument as set out in claim 1 wherein said friction retaining means includes a plurality of wire-form tines arranged in the distal end of said plug and projecting downwardly towards said base.

3. The accessory of claim 2 wherein said plug is coaxially arranged with respect to said base, said base having a substantially plane surface from which said plug extends, said surface having an area larger than the cross sectional area of said largest diameter of the bore of the associated mouthpiece.

* * * * *